Figure 1:
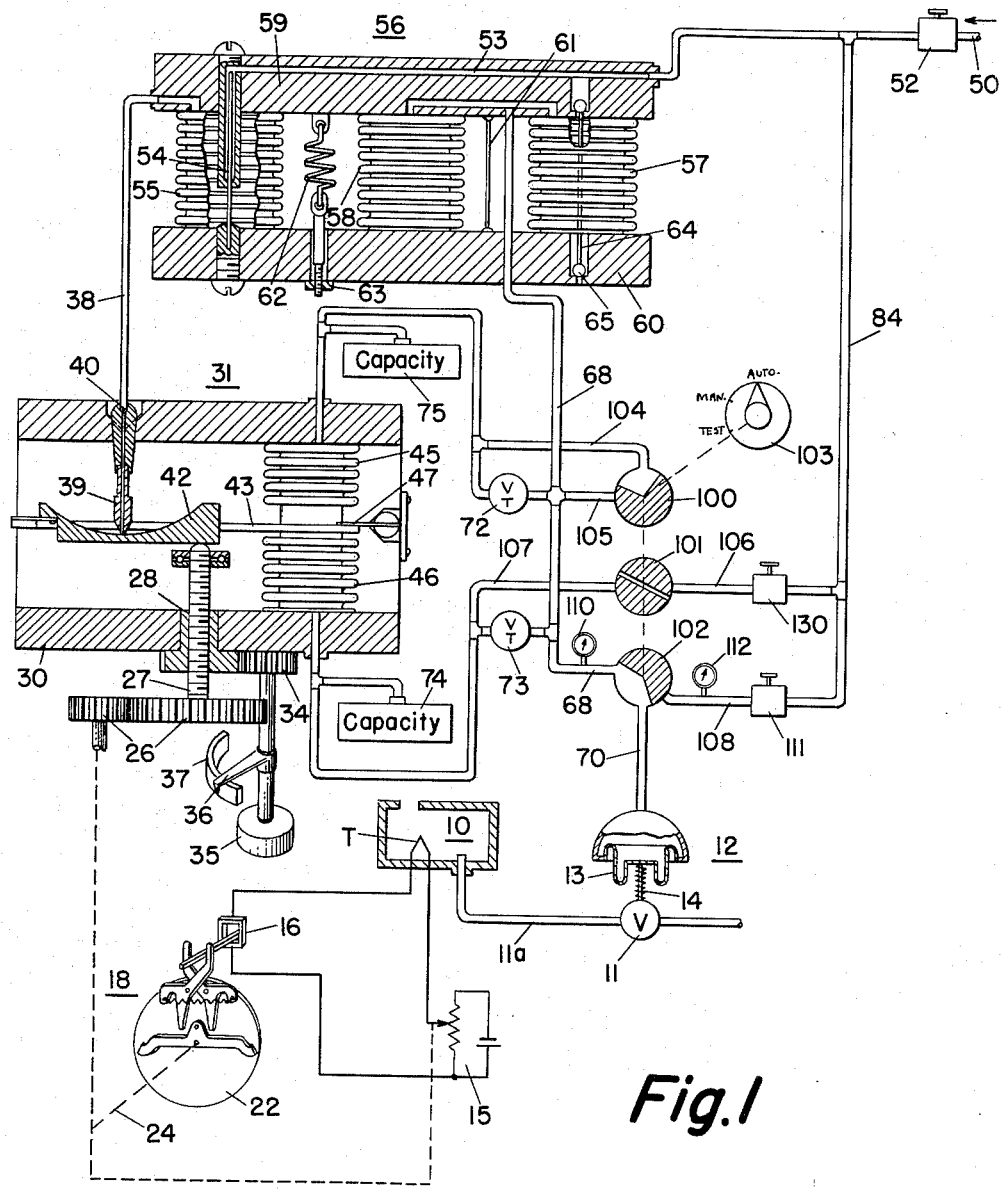

Aug. 9, 1955

L. E. JEWETT 2,714,894

TRANSFER FROM AUXILIARY TO AUTOMATIC CONTROL
IN PRESSURE-ACTUATED SYSTEMS

Filed June 20, 1952

6 Sheets-Sheet 2

*INVENTOR.*
LAWRENCE E. JEWETT

BY

Woodcock and Phelan

ATTORNEYS

Aug. 9, 1955

L. E. JEWETT 2,714,894

TRANSFER FROM AUXILIARY TO AUTOMATIC CONTROL
IN PRESSURE-ACTUATED SYSTEMS

Filed June 20, 1952

6 Sheets-Sheet 4

Fig.3

INVENTOR.
LAWRENCE E. JEWETT

BY

Woodcock and Phelan
ATTORNEYS

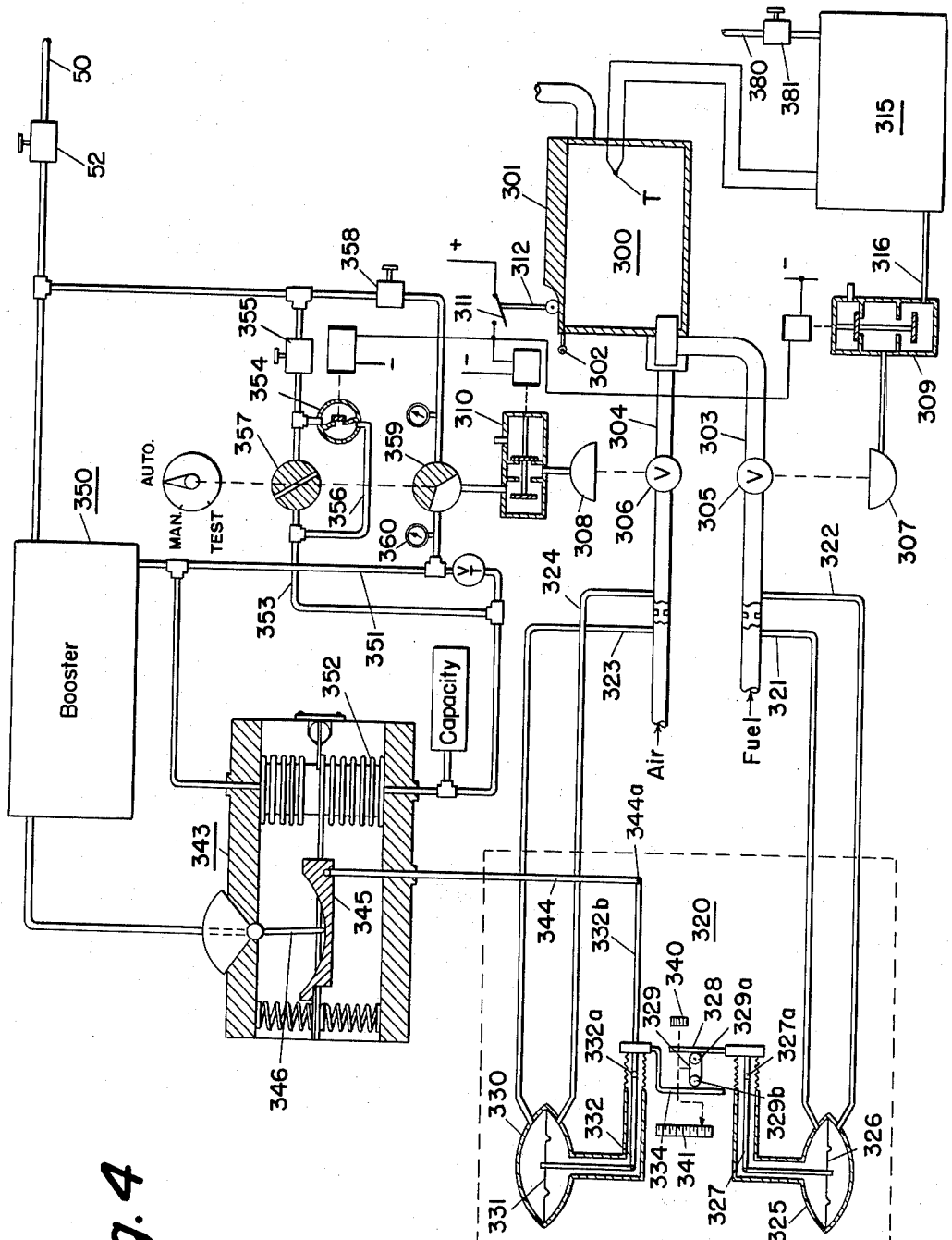

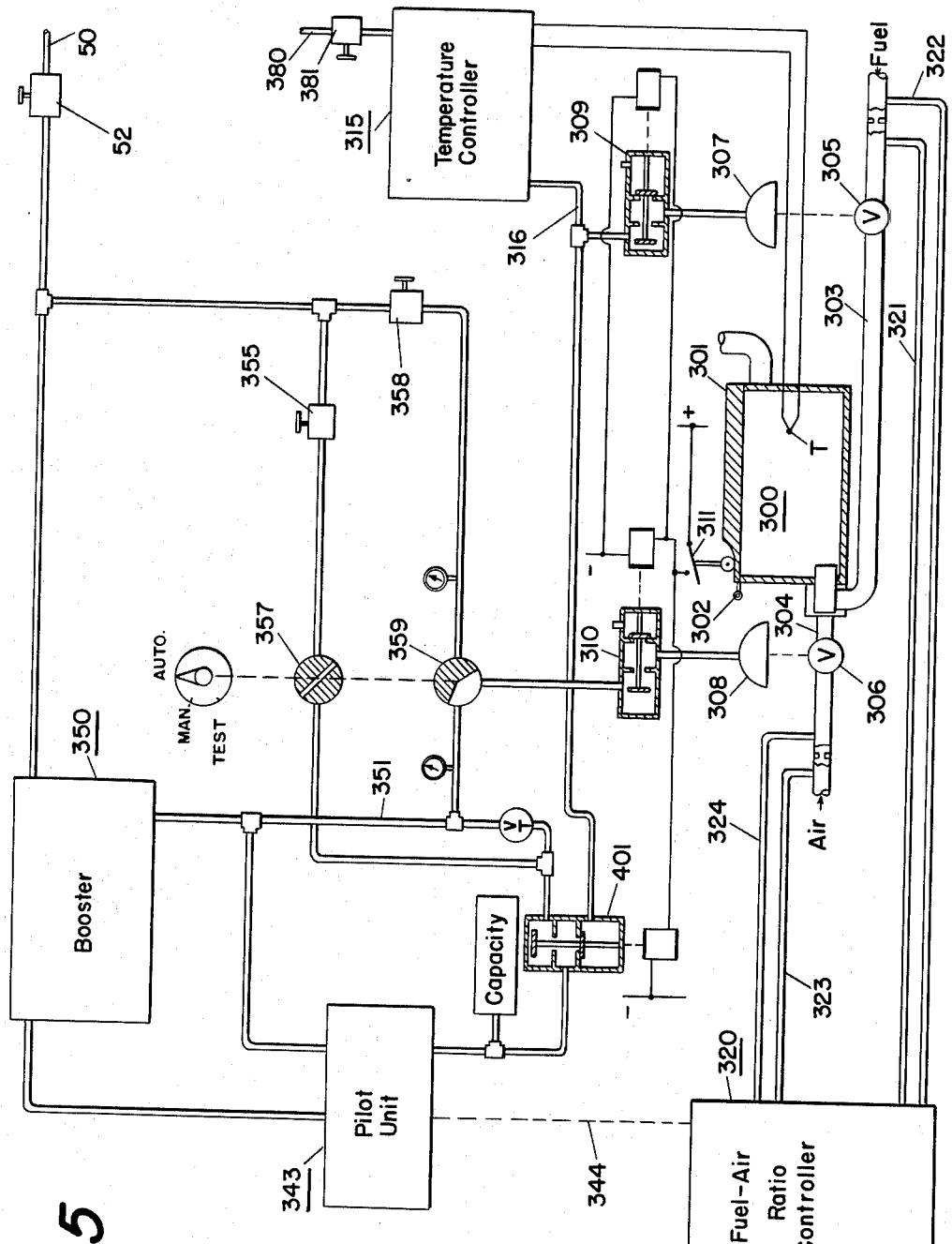

United States Patent Office

2,714,894
Patented Aug. 9, 1955

2,714,894

TRANSFER FROM AUXILIARY TO AUTOMATIC CONTROL IN PRESSURE-ACTUATED SYSTEMS

Lawrence E. Jewett, Newtown Square, Pa., assignor to Leeds and Northrup Company, Philadelphia, Pa., a corporation of Pennsylvania Application June 20, 1952, Serial No. 294,700

24 Claims. (Cl. 137—14)

This invention relates to pneumatic controllers of the type used for the control of the magnitude of a controlled or measured variable, such as a quantity or a condition, as temperature, pH values, rate of flow, or other physical, chemical or electrical conditions, and has for an object the provision of methods of and apparatus for transferring the control from automatic to manual and back again though the quantity or condition be at any value either without changing the position or with predetermined change in position of the condition-controlling element. A feature of the invention is that the transfer can be made at other than the control point without upset of the condition under control by introduction of a modifying action or with improved recovery following an upset caused by temporary suspension of control by introducing in the correct direction a modifying action.

The present invention is applicable to pneumatic controllers generally which include automatic reset control action, such as pneumatic controllers of the type disclosed in McLeod Patent 2,507,606. There are times in the control of a process, a furnace, or the like in which it is desired manually to control the adjustment of a condition-controlling element, though the control thereof may for the most part be entirely automatic. It frequently occurs that the manual control is most desired at the time the condition has deviated from the desired predetermined value, generally referred to by those skilled in the art as the control point. A return to automatic operation while the condition is away from the control point has caused a change in the position of the condition-controlling element due solely to the transfer. Thus, there has been introduced a sudden change which may, and sometimes does, upset the system and requires a substantial time to elapse before smooth control is reestablished.

In said McLeod patent there is disclosed a system in which transfer from automatic to manual operation can be attained with little or no disturbance of the process under control even though the control condition be away from the control point. However, the transfer from manual to automatic means in accordance with the McLeod disclosure can be made only with the condition at the control point in order to avoid disturbance of the process under control, as by a change in the position of the condition-controlling element.

In carrying out the present invention in one form thereof, there are provided a plurality of valves by means of which the air pressure in the part of the system later to control the condition-controlling element is made equal to that then applied to the pneumatic operator at the time the transfer is made in either direction as between automatic and manual control. There is also provided a setting of the valves for a testing operation during which the condition-controlling element may be manually controlled and the components providing for the automatic operation operated as desired without affecting the position of the condition-controlling element.

In another preferred form of the invention there are provided transfer valve means for introducing a predetermined transfer control pressure into a reset chamber of an automatic-pressure control system during application of pressure to a final control element by an auxiliary pressure control system. The transfer control pressure introduced to the reset chamber is independently adjusted either manually or automatically by supplementary control means until the output pressure of the automatic system bears a predetermined relationship to the pressure being applied to the final control elements by said auxiliary control system. This relationship may be such that the output pressure to be applied by the automatic controller is substantially equal to the output pressure being applied by the auxiliary system to the final control element. Alternatively, said transfer control pressure applied to the reset chamber through the transfer valve means is adjustable in accordance with the pressure applied by the auxiliary controller to produce a predetermined difference in said automatic and auxiliary control systems to cause predetermined movement of the final control element when said control element is transferred from control by said auxiliary controller to control by the automatic controller.

For further objects and advantages of the invention and for a detailed description of further novel features, reference is to be had to the following description taken in conjunction with the accompanying drawings, in which:

Fig. 1 diagrammatically illustrates a system including one form of apparatus to which the invention has been applied.

Figure 1A:
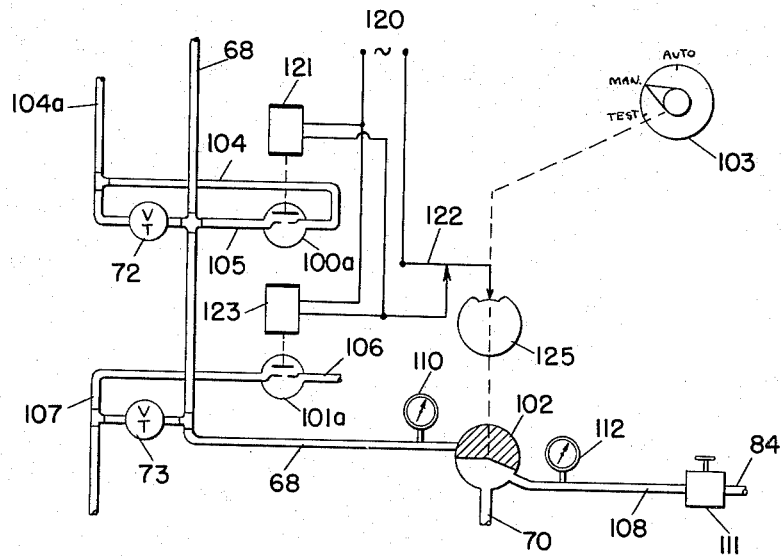
Figure 1B:
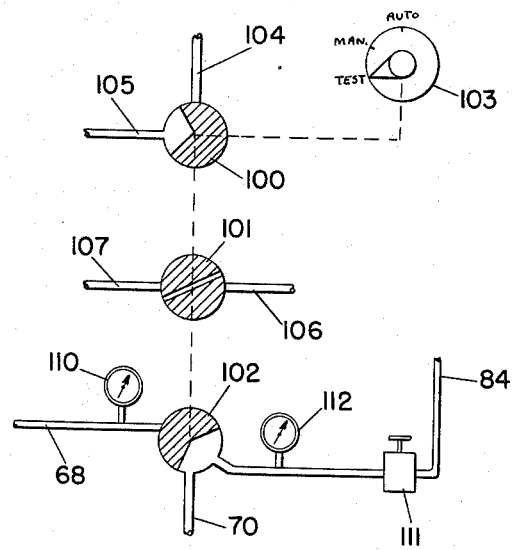
Figure 2:
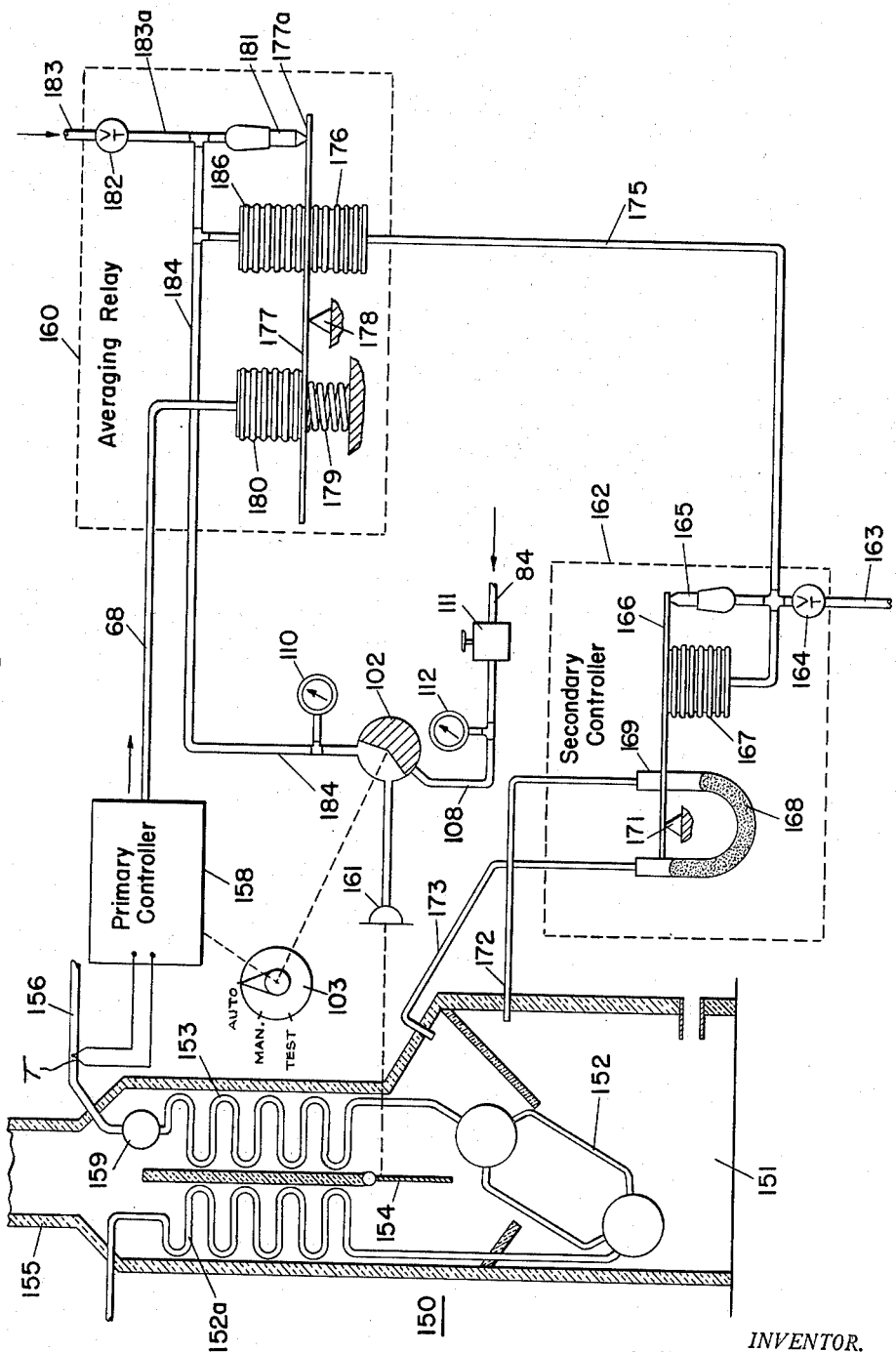

Fig. 1A diagrammatically illustrates electromagnetic valves in place of the manually operable valves of Fig. 1 and with the valves in Fig. 1A in positions corresponding to manual control of the condition-controlling element;

Fig. 1B diagrammatically illustrates the valves of Fig. 1 in the position for testing the pneumatic apparatus while the condtion-controlling element is under manual control;

Fig. 2 diagrammatically illustrates the invention as applied to a condition-controlling system in which two variables are utilized to control the position of the condition-controlling element;

Fig. 3 diagrammatically illustrates a modification of the system shown in Fig. 1 including means for automatically controlling the transfer control pressure applied to the reset chamber of the automatic controller during manual operation of the condition-controlling element;

Fig. 4 diagrammatically illustrates the invention as applied to a condition-controlling system in which two related variables are controlled by separate controllers, and particularly illustrates a system in which one of the controlling elements may be moved a predetermined amount upon return to automatic control of the element from a condition in which the control is not effective; and Fig. 5 diagrammatically illustrates a system similar to Fig. 4 in which the transfer control pressure applied to the reset chamber of one automatic controller is controlled during periods of suspension of automatic control in accordance with the magnitude of the related controlled variable.

Referring to Fig. 1, the invention has been shown as applied to a system of the type fully described in McLeod Patent 2,507,606 and in which it is desired to control the temperature of a furnace 10. The temperature of furnace 10 is to be taken as representative of any measured variable, the magnitude of which is to be under either automatic or manual control. As shown, the measured variable, the temperature of the furnace 10, is varied by changing the position of a condition-controlling element, shown as including operator 12, and the valve 11 connected in a fuel supply line 11a leading to furnace 10.

The valve 11 may be open to any desired extent by means of a pneumatic operator or actuator 12 having a diaphragm 13 and an opposing spring 14. The temperature of the furnace is measured by means of a measuring circuit including a thermocouple T suitably positioned in the furnace and electrically connected to a potentiometer 15 and to a galvanometer coil 16.

While any suitable measuring arrangement may be utilized, that shown includes a mechanical relay 18 operable under the control of the galvanometer 16, details of which will be found in Squibb Patent No. 1,935,732. Upon change of the temperature of furnace 10 from the control point, the mechanical relay 18 adjusts the slidewire of the potentiometer 15 to restore balance of the measuring network, and through mechanical connection 24 and the associated gearing 26 adjusts the position of a baffle 42 relative to a nozzle 39 in the pilot unit 31. The air pressure applied against diaphragm 13 is under the control of the pneumatic system and varies with change of position of baffle 42 relative to nozzle 39 in manner now to be described.

Air is delivered by way of a supply pipe or line 50, a pressure regulator 52, passageway 53, and a restriction 54 located within a bellows 55, the interior of the bellows being connected by pipe 38 to nozzle 39. The bellows 55 forms a part of the pneumatic relay or booster 56 which also includes bellows 57 and 58. All three bellows are mounted between a stationary base 59 and a movable lower plate 60 pivotally supported from the base member 59 as by a flexible hinge or leaf spring 61. A tension spring 62 is adjustable by means of a nut 63 to vary the force applied to plate 60. As fully explained in said McLeod patent, the booster 56 serves to apply to an outlet pipe line 68 air pressure which is a magnification of the air pressure existing in pipe line 38. Thus, as baffle 42 is moved away from nozzle 39, there will be a decrease in pressure in pipe 38 and a corresponding but greater decrease in the pressure in pipe 68, and vice versa.

Associated with baffle 42 is an arm 43 pivoted at 47 and against which are disposed a reset bellows 46 and a proportional bellows 45. If only the bellows 45 were associated with lever 43, there would be present only a proportional-position action; that is, a control action where there is a continuous linear relation between the value of the controlled variable and the position of the final control element, the valve 11. However, by providing the bellows 46 subjected to the same pressure as bellows 45 but through a restriction such as a throttle valve 73, there is eliminated the droop or offset which is an inherent characteristic of a simple proportional-position control system. The result of the reset action due to bellows 46 is that the valve 11 will be adjusted to an extent which will overcome the droop or offset which would otherwise be present.

By including a restriction 72 in the connection to the proportional bellows 45, the negative feedback action on the baffle 42 is delayed, the result being an introduction of rate action into the operation of the system, this being a control action well understood by those skilled in the art and more fully explained in said McLeod patent.

Under some conditions it may be desirable to place the controlled variable under manual control. Accordingly, there is provided transfer valve means comprising valves 100, 101 and 102. In Fig. 1 the valves have been illustrated in the automatic position. There is direct connection by way of valve 102 of line 68 with line 70 leading to the pneumatically operated device 12. By rotating a knob or other suitable actuating device 103 from the indicated automatic position to the manual position, the valve 100 will be rotated in a counterclockwise direction to establish communication between line 104 and line 105, while valve 101 will be rotated to establish communication between lines 106 and 107. At the same time, the three-way valve 102 is rotated to establish communication between line 70 and line 108 and to close the communicating passage between line 70 and line 68.

Prior to the operation of knob 103 from automatic to manual, it will be observed that the air pressure in line 68 may be read from a pressure gauge 110. Hence, by adjusting a pressure regulator 111, the pressure in line 108 as read upon pressure gauge 112 may be made equal to that in line 68 as determined by pressure gauge 110. This adjustment is preferably completed before operation of knob 103 to change the operation of the system from automatic to manual. There is thus avoided any change in position of valve 11 since the air pressure upon the diaphragm 13 will be the same with the valves in either the manual or the automatic positions.

After the operation of the valve means to the manual position, it will be observed that there is a direct connection from line 84 through regulator 111 and valve 102 to line 70. Hence the pressure in line 70 may be varied as desired by operation of the manually controlled pressure regulator 111 to position valve 11 as may be desired.

The communication between lines 104 and 105 established by the valve 100 bypasses the throttle valve 72. The communication between lines 106 and 107 establishes a direct connection from a pressure regulator 130 and line 84 to the reset bellows 46. For reasons later to be explained, the lines controlled by valves 100 and 101 should be of short length.

As it may at times be desirable to locate the knob 103 for valves 102, 101, 100 at a relatively great distance from the controller including the pilot unit 31, the valve means 100 and 101 will not be mechanically operated, as shown in Fig. 1, but may comprise electromagnetically operable valves 100a and 101a as illustrated in Fig. 1A. Consequently, the knob 103 and valve 102 may be any desired distance from the control units 31 and 56. The lines 104 and 105 as well as lines 106 and 107 should be short in order to avoid introduction of any restriction to air flow. Added air capacity by reason of long lines will change the controller-calibration in terms of valves 72 and 73. Long lines will be more susceptible to leaks because of the added fittings which would be required. If desired, the three-way valve 102 may also be of the electromagnetic type, though in Fig. 1A it has been illustrated as of the manually operable rotary type, as in Fig. 1. Better to illustrate the change in flow connections, the knob 103 in Fig. 1A has been illustrated as rotated to the manual position to complete energizing circuits from one side of the source of supply 120 by way of operating coils 121 and 123 of valves 100a and 101a, the cam operated switch 122 and to the other side of the supply line. The coils 121 and 123 are energized to establish the illustrated flow connections. The cam 125 is illustrated as mounted upon the same shaft which is driven by knob 103 and which rotates the valve 102.

It will now be assumed that the knob 103 in Fig. 1 has been rotated to the manual position and that the valve means occupy the positions previously described and as illustrated in the modification of Fig. 1A. It will be further assumed that the pressure regulator 111 has been adjusted to operate the fuel valve 11 a predetermined amount. For example, under manual control by regulator 111 it will be assumed the temperature of furnace 10 has been increased by the opening of fuel valve 11. To increase the opening of fuel valve 11, the regulator 111 is adjusted to increase the air pressure within lines 70 and 108, that increase being reflected by a rise in the indicated pressure by pressure gauge 112. If after the manually controlled operations it is desired to return the system to automatic operation, any differential of pressure between line 68 and line 70 would cause an immediate and substantial movement of valve 11. Such a change in valve position is undesired, and in accordance with the invention may be avoided in manner now to be set forth.

An air pressure regulator 130 disposed between line 84 and valve 101 is effective to establish a transfer equalizing pressure by reason of the communication established by valve 101 between lines 106 and 107 to control the air pressure to the reset bellows 46. Accordingly, the air pressure regulator 130 is adjusted to change the air pressure applied to reset bellows 46 which then acts against lever 43 to position baffle 42 with respect to nozzle 39 to bring the air pressure in line 68 through the action of booster 56 to a value such that the pressure gauge 110 will indicate the same pressure as the gauge 112. It is to be observed that the line 107 directly connects with reset bellows 46 and, hence, the change in pressure therein is not affected by the restriction 73. By bringing the pressure in line 68 to equal that in line 108, by varying the air pressure on the reset bellows 46, the return of the system from manual to automatic may be accomplished without a change in the position of valve 11. After the transfer, the position of valve 11 may gradually change due to any reset action resulting from any existing deviation in the magnitude of the condition from the control point. The rate valve 72 is by-passed by valve 100 to prevent delay in the change in pressure upon bellows 45 due to change in pressure on reset bellows 46. There is thus avoided an undesired rate action due to the manual adjustment of the pressure on the reset bellows. In systems where provisions for rate action are omitted, the valve 100 may be omitted.

Alternatively, the air pressure regulator 130 may be adjusted during manual control of the pressure applied to pneumatic actuator 12 through valve 102 and pressure regulator 111 so that the pressure in reset chamber 46 will adjust the output of booster 56 to bring the air pressure in line 68 to a pressure different from the pressure in line 108 by a predetermined amount, the pressure difference between lines 68 and 108 being indicated respectively by gauges 110 and 112. By such arrangement, it is possible to introduce into the final control element, including actuator 12 and valve 11, a predetermined step in the firing rate of furnace 10 upon return of control for valve 11 from manual or auxiliary control through regulator 11 to automatic control through the pressure in line 68. Accordingly, it will be seen that transfer may be made for the control of the position of valve 11 so that there will either be a predetermined movement upon transfer or substantially no movement; the requirements of the system under control dictating the manner in which transfer is to be made from manual or auxiliary control to automatic control.

If during the operation of the system as a whole it is desired to test the functioning of the automatic control equipment including the pilot device 31 and of the booster 56, the knob 103 need only be operated from the manual position to the "test" position. The valves will the occupy the positions shown in Fig. 1B. The condition-controlling element 11 will remain under the manual control of regulator 111. While fuel valve 11 will not be affected, the pilot unit or device 31 and the booster 56 may be made to operate in any desired manner for purposes of testing their proper functioning. For example, the nozzle 39 may be rotated about its pivotal support 40 to vary the throttling range. The calibration of valves 72 and 73 may be checked. The linkage or mechanical drive 24 and gearing 26 may be operated. The control point setter 35 may be operated to adjust the position of the threaded abutment 27, upon which the baffle 42 rests. There will be a resultant change in pressure in line 38, and there will be a resultant operation of the booster 56 reflected by a change in pressure on the gauge 110. Any desired testing procedure may be carired out on both the pilot device 31 and the booster device 56 without in any way disturbing the position of the condition-controlling valve 11. When the tests have been concluded, the knob 103 will be rotated to the manual position and the adjustments previously described in detail carried out for return of the system to automatic operation, whether the temperature within furnace 10 be at the control point or not.

Mention has already been made of the operation of the control point setter 35, a pointer 36 movable relative to a scale 37 being provided for ease in setting the control point to any desired temperature for furnace 10.

While the present invention has been described in connection with a furnace, it is to be understood that the invention is equally applicable to process-control of widely differing character whether involving heating, cooling, reagent control, or the control of electrical characteristics.

As a further example of a more complicated control problem to which the invention may be applied, reference may now be had to Fig. 2. A steam boiler 150 is diagrammatically illustrated as including the usual fire box 151, a boiler section 152, including economizer 152a, and a steam superheater section 153, with a damper 154 provided for control of the quantity of hot combustion gases passing to the stack 155 in heat exchange with the superheater coil 153. It is well understood by those skilled in the art that if there is a substantial increase in demand for steam as from delivery line 156, there will soon be required increased combustion within chamber 151 generally accomplished by increasing both the fuel and the combustion air supplied thereto. This results in an increased volume of combustion gases with corresponding increase of heat supplied to the superheater coil 153. To maintain the temperature of the superheated steam from coil 153 substantially constant, the damper 154 is adjusted to decrease the percentage of the volume of combustion gases flowing in heat exchange with coil 153 in compensation for an increased total volume of such gases. The pneumatic controller of Fig. 1 has been illustrated diagrammatically by the rectangle 158 labeled "Primary Controller," the associated thermocouple T being responsive to the steam temperature within line 156.

The delivery line 68 from the pneumatic controller 158 extends to an averaging relay 160 instead of to the final control valve as in Fig. 1. The averaging relay is interposed in order that the actuator 161 of the final condition-controlling element illustrated as the damper 154 may be under the joint control of the primary and secondary controllers 158 and 162. The secondary controller 162 is illustrated as supplied with compressed air from a suitable source, as by way of inlet line 163 having a valve-restriction 164 and to which there is connected a nozzle 165. A baffle 166 is adjusted relative to the open end of the nozzle 165 in accordance with the air pressure within a bellows 167 and in accordance with the movement of a body of fluid, such as mercury 168, in a U-tube 169 suspended from baffle 166 on opposite sides of a fulcrum 171.

There are flexible fluid connections leading respectively from open-ended tubes 172 and 173 disposed within the combustion space 151 leading to the respective ends of the U-tube 169. Thus, any change in pressure drop between a region of the boiler nearer the fuel zone and one above that zone is reflected in a change in position of the mercury 168 to move baffle 166 toward or away from nozzle 165. Any change in position will result in a change in pressure within bellows 167 in a direction opposing the movement of baffle 166. The change in pressure is transmitted by a line 175 to a bellows 176 of the averaging relay which tends to rotate a lever 177 relative to its pivotal mounting at 178 and in opposition to a spring 179. The line 68 is connected to a bellows 180 of the averaging relay which bears against the lever 177 to rotate it in a counterclockwise direction, the same direction as for bellows 176. The end 177a of lever 177 forms a baffle for movement toward and away from a nozzle 181 through which air flows by way of restriction 182 from a supply line 183 extending to a suitable source of compressed air. The pressure within line 183a on the nozzle side of restriction 182 is transmitted by a line 184 by way of valve 102 to the actuating device 161. A follow-up bellows 186 is flow-connected to line 184 and acts in opposition to bellows 176 and 180. Thus, it will be seen that the positioning of the damper 154 depends upon the joint effect of change in temperature of the superheated steam and change of gas flow through the combustion space 151 of the boiler 150, the two control effects being averaged by relay 160 by the operation of bellows 176 and 180 with respect to the lever 177.

Only the valve 102 has been illustrated in Fig. 2. It is to be understood that valves 100 and 101 are provided in the pneumatic controller 158 and that the operation will be the same as described in connection with Fig. 1, the pressure gauge 112 and the manual regulator 111 being shown in Fig. 2 as connected to the supply line 84 leading to a suitable source of air supply. The gauge 110 is also shown in Fig. 2 and is used in the same manner and for the same purposes as already described in connection with Fig. 1. However, the gauge 110 in Fig. 2 is not connected to line 68 but is connected to line 184 in order that the air pressure in line 184 may be balanced against that in line 108 for transfer from manual to automatic, and vice versa, without resulting in abrupt change in position of the damper 154 or with only a desired or predetermined movement thereof by establishing different pressures at gauges 110 and 112.

Now that the principles of the invention have been explained in connection with two exemplary embodiments of the invention, it will be understood that certain features may be used without other features thereof and that the control of a condition may be made dependent upon as many variables as desired by using averaging relays by means of which the pressure on the final control element will be jointly dependent upon the desired plurality of conditions.

It is to be further understood that while expansible chambers have been illustrated in the form of bellows actuating baffles relative to nozzles, the principles of the invention are equally applicable to fluid-actuated systems generally, or air-actuated systems in which diaphragms or other expansible-chamber devices are substituted for the bellows and in which valves are substituted for the baffle-nozzle arrangements.

In each form of the invention illustrated in the drawings, the transfer from manual operation under the control of the manually operated pressure regulator 111 to automatic control in response to the output pressure of the automatically operable system may be accomplished at any value within limits established by the pressure variation that may be applied to the reset bellows 46 by pressure regulator 130.

The proportional band, defined as the range of values of the controlled variable which corresponds to the full operating range of the final control element for proportional-position-control action may be shifted with respect to the control point by a change of pressure in the reset chamber or bellows.

If the range of pressure output from the transfer regulator 130 is equal to the range of pressure of the output from the booster unit 56, then with the transfer valve in the "Manual" position the proportional band may be shifted by transfer regulator 130 until either the upper or lower limit of the proportional band coincides with the control point. For every value of the controlled variable not away from the control point by more than the proportional band, there are definite limits over which the output pressure may be varied by transfer regulator 130. If on manual control with the transfer valve in the "Manual" position the pressure on the valve 11, as set by regulator 111, for any value of the controlled variable is outside these limits, transfer from manual to automatic without disturbing the setting of the condition controlling device cannot be achieved. The existence of such a condition would be readily apparent to an operator as he would not be able to obtain equality of the pressures indicated by pressure gauges 110 and 112 by adjustment of transfer regulator 111, and this would indicate that the process under manual control was not within the normal operating capabilities of the automatic controller and that manual control should be continued until the process was brought within the capabilities of the automatic controller or the control point setter of the automatic controller should be repositioned.

If, however, the range of pressure output from transfer regulator 130 is greater than the range of pressure output from the booster unit 56, then the proportional band may be shifted over greater ranges by transfer regulator 130 and the output pressure from the booster unit 56 may be shifted over correspondingly greater ranges than previously. Such an increase of adjustment of the proportional band would make it possible to extend the range of values of the controlled variable over which transfer could be achieved without disturbing the setting of the condition-controlling device.

There is illustrated in Fig. 3 a system similar to that shown in Fig. 1. However, as distinguished from the embodiments of Figs. 1 and 2, it is to be particularly noted that the pressure regulator 130 of Fig. 1 supplying the transfer equalizing pressure through transfer valve 101 to the reset chamber of pilot unit 31 has been replaced in Fig. 3 by means for automatically controlling the transfer pressure to maintain the output pressures from the manual control means and the automatic controller equal. In Fig. 3 this automatic transfer pressure controlling means includes a differential pressure-responsive device 210 arranged to develop a control pressure which varies in magnitude in accordance with the difference in pressures between the manually-applied pressure controlled by regulator 111 and the automatic controller output pressure in pipe 68, connected to the output of booster 56.

In developing the required transfer control pressure automatically so that the automatic control output pressure in line 68, as indicated by gauge 110, will be substantially equal to the pressure applied manually by way of pressure regulator 111 during manual control of pneumatic actuator 12 to vary the position of final control valve 11, there is provided in device 210 a pair of opposed chambers 211 and 212, the pressure differential between which produces a force on diaphragm 213 disposed in sealed arrangement therebetween. The movement of diaphragm 213 is transmitted by rod 214 passing through the chambers 211 and 212 and through sealing diaphragms 215 and 216 respectively in the end walls of device 210. As shown, chamber 211 has applied thereto the manually-controlled pressure governed by regulator 111 and connected to chamber 211 by way of pipe 108a. Opposing the force developed by the manually-controlled pressure in chamber 211 is the pressure in chamber 212 which is directly connected by way of pipe 68 to the output pressure of the automatic control system. The difference in pressures developed in chambers 211 and 212 positions pressure-sensitive diaphragm 213 and rod 214 in accordance with that difference to control the location of baffle or plate 221 with respect to a nozzle 222. Nozzle 222 connected through a restriction 223 to supply line 84 establishes a transfer control pressure in line 224 inversely proportional to the amount of opening between nozzle 222 and baffle 221. Thus, the transfer control pressure in line 224 increases with decreased opening between nozzle 222 and baffle 221, and vice versa. The pressure in line 224 is continuously applied to the reset chamber of pilot unit 31 through transfer valve 101 during the time that the final control valve 11 is under manual control through pressure regulator 111 and pneumatic actuator 12.

In the operation of the embodiment of Fig. 3, it will be noted that when knob 103 is turned to the manual position, valves 100, 101 and 102 are rotated into the same positions as described in the Fig. 1 embodiments of the present invention. However, throughout the time that manual control is being exercised on pneumatic actuator 12 by regulator 111 through valve 102, there is automatically introduced into the reset chamber of pilot unit 31 a transfer pressure developed by differential pressure-responsive device 210, whose output pressure varies in sense and magnitude in accordance with the difference in pressure between the automatic control pressure appearing in line 68 and the manually-applied pressure appearing in line 108a.

If it be assumed that the transfer valve means, including valves 101 and 102, are turned counterclockwise to the position for manual control and the pressure in line 108, as measured by gauge 112, is made greater than the pressure in line 68 by manipulation of regulator 111, there will be applied to pressure chamber 211 a higher pressure than that in chamber 212, causing rod 214 to be raised and decreasing the opening between nozzle 222 and baffle 221. Such a decrease in clearance between the nozzle and baffle will result in an increased pressure in line 224 which is directly applied through transfer valve 101 to the reset chamber in pilot unit 31. The increased reset pressure will result in an increased output pressure in line 68 until that pressure is substantially equal to the manually-controlled pressure in line 108 by the action of booster 56 in response to the operation of pilot unit 31. Increased pressure in line 68 will then appear in chamber 212 to rebalance against the pressure in chamber 211 and return the rod 214 and baffle 221 to substantially their original positions.

Conversely, if the pressure in chamber 212 rises to a value higher than the pressure in chamber 211, rod 214 and baffle 221 will be moved in a downward direction to increase the opening between nozzle 222 and baffle 221. The increased clearance between the nozzle and baffle will, of course, result in increased flow through nozzle 222 and result in a decreased pressure in line 224. Such decreased pressure in line 224 being directly applied to the reset chamber of pilot unit 31 will decrease the pressure in output line 68 from booster 56, and thereby immediately and correspondingly decrease the pressure in chamber 212 until such time as the pressure in chamber 212 is substantially equal to the pressure in chamber 211. When the pressures in chambers 211 and 212 are equalized, rod 214 and baffle plate 221 will be readjusted with respect to nozzle 222 to reestablish substantially the same clearance between the nozzle and baffle that existed before the pressures in chambers 211 and 212 became different. In this way, the transfer pressure in line 224 is arranged to act through the reset chamber of the automatic controller to cause the output pressure of the controller, as measured by gauge 110 to be substantially equal to the manually-applied pressure as measured by gauge 112 throughout the time that final control valve 11 is under manual control through actuator 12 and pressure regulator 111.

As explained hereinbefore, since the output pressure of the automatic controller in line 68 is maintained substantially equal at all times to the manually-applied pressure appearing in line 108, there is made possible the transfer from manual control to automatic control in the absence of application of position-changing pressures to the pneumatic actuator of the final control element. Accordingly, it will be seen that with the arrangement of Fig. 3, the pressures are automatically equalized and there is produced the required transfer pressure to be applied to the pneumatically-operated device 12 by the automatic controller.

Further in accordance with the present invention, the pressures to be applied to the pneumatic control device 12 through automatic control line 68 or manual control line 108 may either be made equal to each other or controlled to have a predetermined difference therebetween by adjustment of the clearance between plate 221 and nozzle 222. It is to be observed that nozzle 222 may be adjusted by rotation of the adjusting nut 225 to extend or retract nozzle 222 in relation to plate 221. Similarly, the U-shaped biasing spring 226 mounted on the lower end of device 210, in conjunction with clamping nuts 227, together with the diaphragms 213, 215 and 216 hermetically sealed to rod 214, control the clearance between nozzle 222 and baffle 221 so that the stable positions of nozzle and baffle may be obtained either when the pressures in chambers 211 and 212 are equal or unequal. In this way the pressure in line 224 may be developed to represent either equality or a predetermined inequality between the pressures in lines 68 and 108. Accordingly, it will be seen that in accordance with the invention the automatic controller output pressure in line 68 may be controlled to bear a predetermined relationship to that applied manually to line 108 at the time of transfer from the manual to automatic control. This predetermined relationship may either be such that the pressures are equal, in avoidance of disturbing the position of the final control element, or the final control element may be moved a predetermined amount upon return of the system to automatic control from manual or auxiliary control.

In the arrangements of Figs. 4 and 5, there are particularly illustrated embodiments of the present invention wherein it is not only possible, but desirable, to produce predetermined movement of the final control element when transfer is made from auxiliary control to automatic control of the condition-controlling element. Accordingly, provision is made to make the pressures applied to the pneumatic actuator different by a predetermined amount at the time of transfer.

In the arrangement of Fig. 4, there is diagrammatically represented a furnace 300, whose cover 301 is removable for adding or withdrawing work, shown as a soaking pit for steel ingots. In such an arrangement, when the cover 301 is removed from furnace 300, as by retracting cover 301 by means of handle 302, it is necessary that the fuel supplied to the furnace be rapidly turned off to prevent waste of fuel and for safety to personnel and equipment. The supply of both fuel, supplied by way of line 303, and air, by way of line 304, are turned off by rapid closure of valves 305 and 306 respectively.

Upon return of the cover 301 to furnace 300, it is desirable to return the flow of heat into the furnace as rapidly as possible, but with predetermined ratio of fuel to air for proper combustion and at a rate greater than when the cover was removed. If only the flow rate of fuel is immediately increased, without accompanying increase in combustion air flow, heavy smoke will be produced. For the foregoing reason, valves 305 and 306 which control the firing rate of furnace 300 are under the control of pneumatic operators 307 and 308, respectively. The actuators for these valves are similar in construction to pneumatic actuator 12 in Fig. 1. Actuators 307 and 308 are arranged to open upon the application of a positive gauge pressure thereto and are closed in the absence of such pressure. Accordingly, when it is desired immediately to turn off the fuel and air supply through lines 303 and 304, when cover 301 is removed, arrangement is made for connecting the pneumatic actuators 307 and 308 to atmospheric or zero gauge pressure. Solenoid-actuated valves 309 and 310 control this selective connection of actuators 307 and 308 either to the associated automatic control system or to atmosphere. Valves 309 and 310 are energized by their associated solenoids when the switch 311 is closed by operation of cam-operated lever 312, lifted by the retraction of furnace cover 301 to connect the solenoids across a suitable source of electric power (not shown). Accordingly, upon opening of the furnace 300, solenoid valves 309 and 310 serve immediately to apply atmospheric pressure to pneumatic actuators 307 and 308 and thereby close valves 305 and 306, respectively.

In returning control of actuators 307 and 308 to automatic control by closure of furnace 300, it is to be noted that the fuel supply through line 303 is directly controlled by automatic temperature controller 315 which may be of the type illustrated in Fig. 1, arranged to produce an output pressure in line 316 for controlling the operation of pneumatic actuator 307 in response to changes in temperature as measured by thermocouple T. In this way the primary controlled-variable, the magnitude of the temperature of furnace 300, serves to control the operation of the fuel flow valve 305 in accordance with that temperature.

However, in addition to controlling the fuel flow to furnace 300 in accordance with the temperature, the system of Fig. 4 includes means for controlling the air flow in accordance with the rate of fuel flow. It will, therefore, be seen that the measured variable, temperature, directly controls the rate of fuel flow, and indirectly by means of an air-fuel ratio controller 320, controls air flow. In this way, fuel flow which is controlled in relation to the measured variable, temperature, is still the measured variable from which the air flow is controlled.

Since the rate of combustion air flow is controlled in response to fuel flow by means of a fuel-air ratio controller 320, it will be necessary to understand the operation of this controller in order to understand how there is produced a predetermined movement of actuator 308 upon return from auxiliary control to automatic control. For these reasons the construction and operation of fuel-air ratio controller 320 will now be described.

To provide the correct proportion of combustion air to fuel, fuel-air ratio controller 320 is arranged to measure the rate of fuel flow by means of a pair of pressure taps 321 and 322 positioned on opposite sides of an orifice in the fuel supply line 303. Simultaneously, the rate of air flow is measured by a pair of taps 323 and 324 across an orifice in the combustion air supply line 304. The pressures in line 321 and 322 are applied to a diaphragm housing 325 on opposite sides of diaphragm 326. The movement of diaphragm 326 in response to differences in pressure thereacross is transmitted by way of a mechanical linkage 327 pivoting about fulcrum point 327a to an arm 328 to apply a force of magnitude representing the rate of fuel flow to one side of an adjustable force-transmitting link 329. At the same time the pressure developed in lines 323 and 324 is connected to a diaphragm housing 330 on opposite sides of a diaphragm 331. Movement of diaphragm 331 in response to differences in pressure across the diaphragm is transmitted by a mechanical linkage 332 pivoted at fulcrum point 332a to operate arm 334 against the other side of force-transmitting link 329 in a direction to oppose the force applied thereto by arm 328 and with a magnitude representing rate of air flow. Any unbalance in the forces applied by arms 328 and 334 against the rollers 329a and 329b of link 329 will result in rotation of extension arm 332b about pivot 332a which will vary the position of baffle 345 in pilot unit 343 by raising or lowering of mechanical link 344 connected to arm 341 at pivot 344a. Such change in the position of baffle 345 will result in a change in the output pressure from booster 350 and cause adjustment of pneumatic actuator 308 to control the position of valve 306 until such time as the rate of fuel flow and air flow produce equal forces on levers 328 and 334 at link 329 of ratio controller 320.

The ratio of fuel flow to air flow is regulated by vertical adjustment of link 329 by movement of knob 340. Such ratio may be indicated by scale 341. While the control point of the baffle 345 with respect to nozzle 346 in pilot 343 will be substantially constant for all ratios of fuel and air flow within the capacity of the fuel-air ratio controller, the ratio of air flow to fuel flow is established by the position of link 329 along arms 328 and 334 and determines the force required across diaphragm 331 to balance the force across diaphragm 326. Accordingly, it will be understood that while mechanical link 344 must be maintained in a predetermined position in space to hold baffle 345 fixed relative to nozzle 346, the opposing forces required at arms 328 and 344 to maintain that position may be varied with respect to each other by vertical movement of link 329 between the fulcrums 327a and 332a. Such vertical movement varies the length of lever arms 328 and 334 to increase and decrease their lengths respectively from the fulcrums. The forces appearing at arms 328 and 334 are, of course, dependent upon the differences in pressures across the orifices in the fuel flow line and the air flow line, respectively. Accordingly, these forces represent rates of fuel flow and air flow.

In the system of Fig. 4, when the furnace cover 301 is removed from furnace 300, the fuel flow and air flow are immediately reduced to substantially zero by the operation of switch 311 to energize solenoid valves 309 and 310. However, due to the cover being removed, there will immediately appear at thermocouple T an indication of reduced temperature in furnace 300 resulting in an increased output pressure from temperature controller 315 appearing at line 316. Since the rates of fuel flow and air flow are both reduced to zero by operation of solenoid valves 309 and 310 in connecting actuators 307 and 308 to atmosphere and thereby closing valves 305 and 306, the fuel-air ratio controller 320 will have substantially equal pressures applied across the diaphragms 326 and 331. Under such conditions, control valve 306 is independent of the fuel-air ratio controller and the pressure in line 351 will be drifting. When the controller is again connected for automatic operation, a period will elapse before proper ratio of air to fuel can be reestablished. This period may be substantially reduced by proper adjustment of the reset pressure during auxiliary control. For this reason, provision is made for predetermining the reset pressure and hence the output pressure in line 351 from the automatic controller during the time the furnace cover is off by providing means for introducing into the reset chamber 352 through line 353 and solenoid valve 354 an auxiliary pressure, manually controlled by pressure regulator 355. It will be seen that solenoid valve 354 is positioned in line 356 which by-passes transfer valve 357 so that pressure regulator 355 may serve the dual function of controlling the transfer pressure whether that pressure be applied during manual control through pressure regulator 358 and transfer valve 359 or during auxiliary control of actuator 308. In this way the output pressure in line 351 from the automatic control system may be regulated to a predetermined value, as detected and indicated by gauge 360. Simultaneously, there is provided a predetermined pressure for application to pneumatic actuator 308 upon closure of the furnace 300 by replacing cover 301, and thereby deenergizing solenoid valve 310.

In the normal operation of furnace 300 after the cover 301 has been returned to its covering position on furnace 300, there is immediately introduced a high flow of fuel through valve 305 due to the operation of temperature controller 315 in response to deviation of the controlled variable from the control point. As mentioned above, if provision is not made for simultaneously introducing a proper ratio of combustion air, there will be produced undesirable heavy smoking. Hence, there is simultaneously introduced a predetermined flow of combustion air by the immediately previous application of a predetermined pressure to the reset chamber 352 of pilot unit 343. Thus, there is applied to actuator 308 which operates air control valve 306 a pressure producing a preliminary large opening movement providing excess combustion air for a short period. Normal fuel-air ratio control will eventually produce as a result of action of controller 320 a stable, desired ratio of air to fuel.

In the arrangement of Fig. 5, there is illustrated a further embodiment of the present invention as particularly related to the control of temperature in a furnace of the type shown in Fig. 4. As distinguished from the arrangement of Fig. 4, there is automatically produced a predetermined transfer pressure from an auxiliary pressure source which is applied to the reset device in the automatic control system. In Fig. 5, the auxiliary pressure is automatically supplied by the output pressure of the temperature controller 315. As shown, the output pressure of controller 315 in addition to being connected to solenoid valve 309 by way of line 316 is also connected to one side of a solenoid valve 401, operable in parallel with solenoid valves 309 and 310, so that upon removal of the furnace cover 301 from furnace 300, the solenoid of valve 401 operates to connect the reset device, including the reset capacity, directly to the output of temperature controller 315. In response to this output pressure, the pressure in line 351, the output line of the automatic controller, normally operated by the fuel-air ratio controller 320, is controlled to bear a predetermined relation to the magnitude of the temperature in furnace 300 and consequently the magnitude of the rate of fuel flow which will occur when the furnace cover is replaced. In this way provision is made for automatically establishing a desired and predetermined fuel-air ratio for proper combustion conditions sooner than would be possible if the air supply were entirely dependent upon the operation of the fuel-air ratio controller.

In operation, when cover 301 is retracted, solenoid valves 309, 310 and 401 are simultaneously operated by closure of switch 311 to connect the solenoids across a source of D. C. power. Solenoid valves 309 and 310 immediately connect pneumatic actuators 307 and 308, respectively, to atmosphere and cause valves 305 and 306 to close, thereby stopping the flow of both fuel and air.

With cover 301 removed from furnace 300, there will, of course, be a rapid decrease in temperature within the furnace thereby causing the temperature controller 315 to produce an increasing output pressure signal in line 316 in response to the signal from the thermocouple T. In this way, there is produced, during the time that cover 301 is off the furnace, an operating pressure for pneumatic actuator 307 so that upon return of the cover to the furnace, solenoid valve 309 will immediately apply that increased output pressure, developed in line 316 by controller 315, to actuator 307 and thereby open valve 305 a corresponding amount for flow of fuel through line 303. Accordingly, there is provided a predetermined step in the movement of actuator 307 and in the position of valve 305 when control of the rate of fuel flow is returned to automatic temperature controller 315.

Since it also is necessary concurrently to increase rapidly the flow of combustion air, as described above, when cover 301 is returned to its covering position, the solenoid valve 401 is energized by operation of switch 311 to connect the reset device in pilot unit 343 to the output pressure in line 316 for continuous and direct application of the output pressure from controller 315 to the reset device during the time the cover 301 is retracted and actuators 307 and 308 are connected to atmosphere.

It will be seen that in the system of Fig. 5, the transfer control pressure applied to the reset device is the output pressure from the auxiliary temperature controller 315. By thus varying the pressure in the reset device, there is produced an automatic controller output pressure in line 351 from booster 350 which will be controlled primarily in accordance with the magnitude of another condition, temperature, rather than the condition which normally controls the output of booster 350, i. e., rate of fuel flow. As shown, the output pressure in line 351 is connected to solenoid valve 310 through transfer valve means 359 so that upon closure of cover 301 on furnace 300, a pressure will be immediately applied to pneumatic actuator 308 to operate air-supply valve 306. This pressure will bear a relationship to that applied to actuator 308 when said actuator is connected to atmosphere through solenoid valve 310. This relationship is determined by the combustion air requirements, as measured by the output pressure of the temperature controller 315.

From the foregoing detailed description it will be seen that there have been provided various forms of apparatus, each capable of performing the method of the invention for transferring a pressure-operated final control element between an auxiliary pressure-control system and an automatic pressure-control system so that movement of the final control element may be controlled to a predetermined extent. In the arrangements of Figs. 1–3 the auxiliary pressure-control system includes the pressure regulator 111 which is manually operable to provide a manual control pressure to the final control element. In the arrangements of Figs. 4 and 5 the auxiliary pressure-control system to which the final control element is connected is the atmosphere.

In accordance with the invention, and in each of the embodiments thereof, there is applied directly to a reset chamber of an automatic pressure-control system, during application of a control pressure to the final control element by the auxiliary system, a transfer pressure variable manually or automatically to produce an automatic control pressure which bears a predetermined relationship to the auxiliary control pressure at the time of transfer from auxiliary to automatic control. In the arrangements of Figs. 1 and 2 the transfer pressure applied to the reset chamber is independently variable by means of manually operable pressure regulator 130. In Fig. 3 the transfer pressure is automatically developed and applied to the reset chamber by differential pressure-responsive device 210. In the arrangement of Fig. 4 pressure regulator 355 is provided for varying the pressure applied to the reset chamber, while in Fig. 5 that pressure is provided by the output of the temperature controller 315.

In the arrangements of Figs. 1–3 the output pressure of the automatic control system to be applied to the final control element is usually made substantially equal to the pressure applied by the auxiliary system. On the other hand, in the arrangements of Figs. 4 and 5 the output pressure of the automatic controller is preferably made a predetermined amount greater than the pressure (atmospheric) applied by the auxiliary system to the final control element so that there will be produced a predetermined movement of the final control element.

This application is a continuation-in-part of my abandoned copending application, Serial No. 188,493, filed October 5, 1950.

What is claimed is:

1. Transfer means for an automatically operable pressure-actuated control system for transferring the control of the final condition-controlling element from manual to automatic without changing the setting thereof though the condition under control be at any value, said system including a reset device for automatic reset control action, comprising a pressure regulator, valve-transfer means for establishing a flow connection between said reset device and a source of supply by way of said pressure regulator, a second regulator, said valve-transfer means establishing a flow connection from a source of supply to said condition-controlling element by way of said second pressure regulator, and pressure gauges for indicating that the pressure in an output line from the control system and the pressure supplied to said controlling element have been equalized at the time transfer is to be made by operation of said valve-transfer means from manual to automatic to reestablish the flow connections for automatic control without disturbing the setting of said condition-controlling element.

2. Transfer means for an automatically operable pressure-actuated control system for transferring the control of the final condition-controlling element from manual to automatic without changing the setting thereof though the condition under control be at any value, said system including a reset device for automatic reset control action and a rate-action restriction comprising a pressure regulator, valve-transfer means for establishing a flow connection between said reset device and a source of supply by way of said pressure regulator and for establishing a by-pass connection around said restriction, a second regulator, said valve-transfer means establishing a flow connection from a source of supply to said condition-controlling element by way of said second pressure regulator, and pressure gauges for indicating that the pressure in an output line from the control system and the pressure supplied to said controlling device have been equalized without rate action at the time transfer is to be made by operation of said valve-transfer means from manual to automatic to reestablish the flow connections for automatic control without disturbing the setting of said condition-controlling element.

3. Transfer means for an automatically operable pressure-actuated control system for transferring the control of the final condition-controlling element from manual to automatic without changing the setting thereof though the condition under control be at any value, said system including a proportional-position chamber, a reset chamber, and a rate-action restriction comprising a pressure regulator, valve-transfer means for establishing a flow connection between said reset chamber and a source of supply by way of said pressure regulator and for completing a by-pass connection around said restriction, a second regulator, said valve-transfer means establishing a flow connection from a source of supply to said condition-controlling element by way of said second pressure regulator, and pressure gauges during manual operation being respectively flow-connected to said element and to said automatic system for indicating that the pressure in an output line from said control system and the pressure supplied to said controlling element have been equalized at the time transfer is to be made by operation of said valve-transfer means from manual to automatic to reestablish the flow connections for automatic control without disturbing the setting of said condition-controlling element.

4. In a pneumatic control system for maintaining a condition at a desired value comprising a final control element responsive to pressure variations applied thereto, automatic means for applying to said final control element a variable pressure varying in response to the deviation of said condition from said desired value and to the time integral of said deviation, the combination of a manually adjustable pressure-controlling device, transfer means for applying either said manually adjustable pressure or said variable pressure to said final control element, said automatic means being independently adjustable to bring its output pressure to a value equal to said manually adjustable pressure whereby transfer may be made by said transfer means from under control of said manually adjustable device to control by said variable pressure in the absence of application of position-changing pressures to the final control element.

5. In a control system having a pressure-actuated control element responsive to the pressure applied thereto for controlling the magnitude of a condition, a controller for producing a pressure dependent upon the magnitude of said condition and the extent and duration of departure of said magnitude from a predetermined value including a reset chamber, the combination of a first pressure regulator for producing a manually adjustable pressure, means to apply to said pressure-actuated control element either the output from said controller or the output from said first pressure regulator, means for simultaneously indicating the output from said controller and from said first pressure regulator, and a second pressure regulator connected to said reset chamber for independently adjusting the output from said controller whenever said pressure-actuated control element is connected to the output from said first pressure regulator.

6. In a control instrument of the type which includes a fluid-conducting nozzle, a baffle having a flow-obstructing surface in cooperative relation with the open end of said nozzle for variation of the pressure within said nozzle, condition-controlling means operable by fluid pressure, means for applying to said condition-controlling means a pressure related to that within said nozzle automatically to vary its position with changes of pressure within said nozzle, a lever for adjusting said baffle relative to said nozzle, opposed bellows acting on said lever, means for applying to said bellows by one or more fluid-flow restrictions the pressure applied to said condition-controlling means for introduction into the system of a proportional-position control action, a rate action and a reset control action, the combination of a manually operable pressure-controlling valve, transfer means for connecting said condition-controlling means for operation under the control of said manually operable control valve and for simultaneously completing a by-pass connection around at least one of said restrictions, and a transfer regulator for varying air pressure, said transfer means including valve structure for connecting said reset bellows to a source of air pressure by way of said transfer regulator whereby the air pressure within said reset bellows may be varied until the output pressure at said nozzle bears a predetermined value relative to the air pressure applied to said condition-controlling means preparatory to return of said transfer means for automatic control of said condition-controlling means.

7. The combination set forth in claim 6 in which said transfer means has a third position in which there is interrupted the flow connection between said transfer regulator and said reset bellows for test operation of the control instrument without affecting the air pressure applied to said condition-controlling means.

8. The combination set forth in claim 6 in which there is interposed between said actuator and the line in which the air pressure is under the control of said nozzle and baffle an averaging relay, said averaging relay having a chamber subject to the pressure under the control of said nozzle and a second chamber aiding the action of said first chamber, condition-responsive means for varying the pressure applied to said second chamber, a second nozzle connected through a restriction to a source of air pressure, a baffle positioned relative to said second nozzle by said chambers, and a line including said transfer means for connecting said actuator for application thereto of a pressure determined by the operation of said averaging relay, and a third chamber subject to the output pressure from said averaging relay for opposing said first and second chambers.

9. In a pneumatic system of the type including relatively movable pressure-controlling elements an expansible proportional-position control chamber and an opposed expansible reset chamber arranged to act oppositely in the positioning of said elements, condition-responsive means for positioning said elements, condition-controlling means, pressure-actuated means for operating said condition-controlling means in response to change of pressure, the combination of transfer means operable in one position to establish a flow connection to said pressure-actuated means varying with change of pressure under control of said elements, flow connections including a restriction from each of said chambers for applying by way of each flow restriction air pressure of magnitude related to that applied to said pressure-actuated means, said transfer means in a second position completing a by-pass connection around the restriction in the flow line leading to said proportional-position chamber, and transferring the connection from said pressure-actuated means to a different source of pressure, a manually operable pressure regulator in said last-named connection, a transfer regulator, said transfer means in said second position completing a connection from said different source of pressure by way of said transfer regulator to said reset chamber through a path by-passing said flow restriction associated with said reset chamber for adjustment of the air pressure within said reset chamber to bring the pressure under the control of said elements to the same value as that then applied by way of said manual regulator to said pressure-actuated means.

10. In a control instrument of the type which includes a fluid-conducting nozzle, a baffle having a flow-obstructing surface in cooperative relation with the open end of said nozzle for variation of the pressure within said nozzle, condition-controlling means operable by fluid pressure, means for applying to said condition-controlling means a pressure related to that within said nozzle automatically to vary its position with changes of pressure within said nozzle, a lever for adjusting said baffle relative to said nozzle, opposed bellows acting on said lever, means for applying to said bellows by one or more fluid-flow restrictions the pressure applied to said condition-controlling means for introduction into the system of a proportional-position control action, a rate action and a reset control action, the combination of a manually operable pressure controlling valve, transfer means for connecting said condition-controlling means for operation under the control of said manually operable control valve and for simultaneously completing by-pass connection around at least one of said restrictions, and a transfer regulator for varying air pressure, said transfer means including valve structure for connecting said reset bellows to a source of air pressure by way of said transfer regulator whereby the air pressure within said reset bellows may be varied until the output pressure at said nozzle bears a predetermined value relative to the air pressure applied to said condition-controlling means preparatory to return of said transfer means for automatic control of said condition-controlling means, said transfer means including valve structure to provide a third position for said transfer means for interrupting the flow connection between said transfer regulator and said reset bellows and for simultaneously interrupting said by-pass connection for test operation of the control instrument without affecting the air pressure applied to said condition-controlling means.

11. The method of transferring a pressure-operated final control element between an auxiliary pressure-control system and an automatic pressure-control system including a reset chamber which comprises varying the pressure within said reset chamber during the application of pressure to said final control element by said auxiliary system and independently of the output pressures of said systems until the output pressure of said automatic system is substantially equal to the output pressure of said auxiliary system applied to said final control element, and transferring the pressure applied to said final control element from said auxiliary system to said automatic system with the latter having its said output pressure at the time of transfer established by said pressure applied to said reset chamber.

12. The method of transferring control of a pressure-operated final control element from an auxiliary controller to an automatic controller to produce predetermined movement of the final control element in response to changes of pressure applied thereto, said controller including a reset chamber, which comprises applying a transfer control pressure directly to said reset chamber of the automatic controller during auxiliary control of said final control element, independently adjusting said transfer control pressure in accordance with the pressure applied by said auxiliary controller to said final control element until the output pressure of said automatic controller bears a predetermined relationship to that being applied to said final control element by said auxiliary controller and then transferring said final control element from the control of said auxiliary controller to control by said output pressure of said automatic controller.

13. The method of transferring a pressure-operated final control element of a pressure-responsive system including a reset chamber from a manual controller to an automatic controller in avoidance of change of pressure upon the final control element which comprises connecting said reset chamber of the automatic controller to a source of pressure, independently adjusting the pressure of said reset chamber until the output pressure from the automatic controller is substantially the same as that supplied to said final control element by said manual controller and then transferring said final control element from the control of said manual controller to the control of said output pressure of said automatic controller.

14. The method of transferring a pressure-operated final control element of a pressure-responsive system including a reset chamber and a rate-action restriction from a manual controller to an automatic controller in avoidance of change of pressure upon the final control element which comprises directly connecting said reset chamber of the automatic controller to a source of pressure, independently adjusting the pressure of said reset chamber until the output pressure from the automatic controller in the absence of rate-action is substantially the same as that supplied to said final control element by said manual controller and then transferring said final control element from the control of said manual controller to the control of said output pressure of said automatic controller.

15. In a pressure-actuated control system having an element responsive to the pressure applied thereto for controlling the magnitude of a condition, and a controller for producing a first pressure dependent upon the magnitude of said condition, said controller including a reset chamber, the combination of means for developing a second pressure of predetermined magnitude independent of said first pressure, transfer means for selectively applying to said pressure-actuated control element one or the other of said pressures, and means for applying a predetermined transfer pressure directly to said reset chamber for adjusting the magnitude of said first pressure whenever said pressure-actuated control element is connected to said second pressure.

16. A system in accordance with claim 15 in which said predetermined transfer pressure is applied by the output pressure of an auxiliary controller, said output pressure being controlled in accordance with the magnitude of another condition related to the first-named condition.

17. In a pneumatic control system for maintaining a condition at a desired value having a final control element responsive to pressure variations applied thereto, automatic means for applying to said final control element a pressure variable in response to the deviation of said condition from said desired value, said automatic means including a reset chamber, the combination of a manually adjustable pressure-controlling device, transfer means for applying either said manually adjustable pressure or said variable pressure to said final control element, means for introducing into said reset chamber a transfer control pressure variable in response to the pressure difference between said manually adjustable pressure and said variable pressure while said final control element is under control of said manually adjustable pressure, whereby transfer may be made by said transfer means from control by said manually adjustable pressure to control by said variable pressure in the absence of application of position-changing pressures to the final control element.

18. A system in accordance with claim 17 in which said transfer control pressure is developed by a pressure-differential device, connecting means for applying said variable pressure to one side of said device and said manually adjustable pressure to the opposite side of said device, and means responsive to the difference in said variable and adjustable pressures to produce said control pressure.

19. In a pneumatic control system for maintaining a condition at a desired value having a final control element responsive to pressure variations applied thereto, and automatic means for applying to said final control element a variable pressure varying in response to the deviation of said condition from said desired value, said automatic means including a reset chamber, the combination of means for producing an auxiliary pressure, transfer means for applying either said auxiliary pressure or said variable pressure to said final control element, means for introducing into said reset chamber a transfer control pressure variable in accordance with the pressure difference between said auxiliary pressure and said variable pressure while said final control element is under control of said auxiliary pressure, whereby transfer may be made by said transfer means from control by said auxiliary pressure to control by said variable pressure for the final control element to produce a predetermined movement of said element.

20. In a pneumatic control system for maintaining a condition at a desired value comprising a final control element responsive to pressure variations applied thereto, and automatic means for applying to said final control element a variable pressure varying in response to the deviation of said condition from said desired value and having a reset chamber, the combination of a manually adjustable pressure-controlling device, transfer means for applying either said manually adjustable pressure or said variable pressure to said final control element, means for introducing into said reset chamber a control pressure variable in accordance with the pressure difference between said manually adjustable pressure and said variable pressure while said final control element is under control of said manually adjustable pressure, whereby transfer may be made by said transfer means from control by said manually adjustable device to control by said variable pressure in the absence of application of position-changing pressures to the final control element.

21. Transfer means for an automatically-operable pressure-actuated control system having a reset device for transferring the control of a final condition-controlling element from manual to automatic control, comprising a pressure regulator, valve-transfer means for establishing a flow connection from a source of supply to said condition-controlling element by way of said pressure regulator, a differential-pressure responsive device for producing a transfer control pressure, said device including differential-pressure sensitive means having connected thereto the pressure applied by said pressure regulator and the pressure in an output line from said automatic control system, and control-pressure developing means responsive to said sensitive means for varying said transfer control pressure in accordance with the differences in pressures applied to said device, said valve-transfer means establishing a flow connection for applying said transfer control pressure to said reset device when said condition-controlling element is on manual control to make the pressure applied to said final condition-controlling element by said automatic control system equal to the pressure applied by said regulator at the time of transfer of said valve-transfer means from manual to automatic to reestablish the flow connections for automatic control without disturbing the setting of said condition-controlling element.

22. Transfer means for an automatically-operable pressure-actuated control system having a reset device for transferring the control of the final condition-controlling element from auxiliary to automatic control comprising a pressure supply means, valve transfer means for selectively establishing a flow connection to said condition-controlling element from either said automatic control system or said pressure supply means, means for producing a transfer control pressure, said valve transfer means establishing a flow connection for introducing said transfer control pressure directly into said reset device when said valve transfer means connects said condition-controlling element to said pressure supply means, and means for regulating said transfer control pressure applied to said reset device to control the output pressure of said automatic control system so that said output pressure applied to said final condition-controlling element by said automatic control system will bear a predetermined relationship to the pressure from said pressure supply means at the time said transfer means is operated to return control of said condition-controlling element from auxiliary to automatic by reestablishing the flow connections for automatic control.

23. A system in accordance with claim 22 in which said pressure supply means includes a connection to the atmosphere and said transfer control pressure is controlled to bear a predetermined relationship to atmospheric pressure.

24. Transfer means for an automatically-operable pressure-actuated control system having a reset device for transferring the control of the final condition-controlling element from manual to automatic control, said transfer means comprising a pressure regulator for manual control of said condition-controlling element, valve-transfer means for establishing a flow connection from a source of supply to said condition-controlling element by way of said regulator, pressure-responsive means for detecting differences in the control pressures applied manually and automatically, said pressure-responsive means being connected to the pressure applied by said pressure regulator and the pressure in an output line from said control system, said valve-transfer means establishing a direct flow connection to said reset device for adjustment of the pressure therein to an extent sufficient to make the pressure applied to said controlling element equal to the pressure applied by said pressure regulator at the time transfer is made by operation of said valve-transfer means from manual to automatic to reestablish the flow connections for automatic control without disturbing the setting of said condition-controlling element.

References Cited in the file of this patent

UNITED STATES PATENTS

| 2,311,853 | Moore | Feb. 23, 1943 |
| 2,369,887 | Eckman | Feb. 20, 1945 |
| 2,476,104 | Mason | July 12, 1949 |